(12) United States Patent
Poppi

(10) Patent No.: US 6,325,200 B1
(45) Date of Patent: Dec. 4, 2001

(54) SELECTING DEVICE FOR ORIENTING IN A PREDETERMINED POSITION A SUCCESSION OF CAPS FOR SEALED POURABLE FOOD PRODUCT PACKAGES

(75) Inventor: Luca Poppi, Formigine (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/546,661

(22) Filed: Apr. 10, 2000

(30) Foreign Application Priority Data

Jun. 30, 1999  (EP) .................................................. 99830412

(51) Int. Cl.$^7$ .................................................. B65G 47/24
(52) U.S. Cl. ............................................ 198/395; 198/399
(58) Field of Search .................................... 198/399, 395; 221/163, 171, 173, 278

(56) References Cited

U.S. PATENT DOCUMENTS

| | | | |
|---|---|---|---|
| 2,732,114 | | 1/1956 | Annen .................................... 226/75 |
| 3,079,042 | | 2/1963 | Sterling .................................. 221/14 |
| 3,633,765 | * | 1/1972 | Bennet ................................. 214/1 BB |
| 3,734,268 | * | 5/1973 | Burger et al. ........................... 198/33 |
| 3,992,857 | | 11/1976 | Giacomelli et al. ................... 53/306 |
| 4,352,421 | | 10/1982 | Olsson et al. .......................... 198/392 |
| 5,044,872 | * | 9/1991 | Hunt et al. ............................. 414/786 |
| 5,050,723 | * | 9/1991 | Herzog ................................... 198/395 |
| 5,078,258 | * | 1/1992 | Van Der Schoot ................... 198/384 |
| 5,139,132 | * | 8/1992 | Licht ...................................... 198/376 |
| 5,769,202 | * | 6/1998 | Itoh et al. .............................. 198/395 |
| 5,919,028 | * | 7/1999 | Edqvist ................................. 414/754 |
| 6,062,395 | * | 9/1998 | Oravetz et al. ....................... 209/644 |
| 6,189,676 | * | 5/1999 | Ansaloni ............................... 198/399 |

* cited by examiner

Primary Examiner—Christopher Ellis
Assistant Examiner—Rashmi Sharma
(74) Attorney, Agent, or Firm—Burns, Doane, Swecker & Mathis, L.L.P.

(57) ABSTRACT

A selecting device (1) having a conveyor (5) for receiving a succession of caps (2)—for sealed pourable food product packages—arranged randomly in two opposite input positions, and for transferring the caps (2) along a path (P) to an output station (7); a sensor assembly (8) for determining the position of each cap (2); and an expulsion assembly (9) located at the output station (7) and activated selectively by the sensor assembly (8) to expel from the conveyor (5) relative caps (2) in a first of the input positions; the path (P) having a U-shaped orienting portion (P2) along which the caps (2) fed to the conveyor (5) in a second of the input positions are turned over through 180° into the first input position; and a first and a second air nozzle (33, 34) of the expulsion assembly (9) being located respectively upstream and downstream from the orienting portion, and being activated independently by the sensor assembly (8) to act on relative caps (2) facing the first and second air nozzle. (FIG. 1)

16 Claims, 2 Drawing Sheets

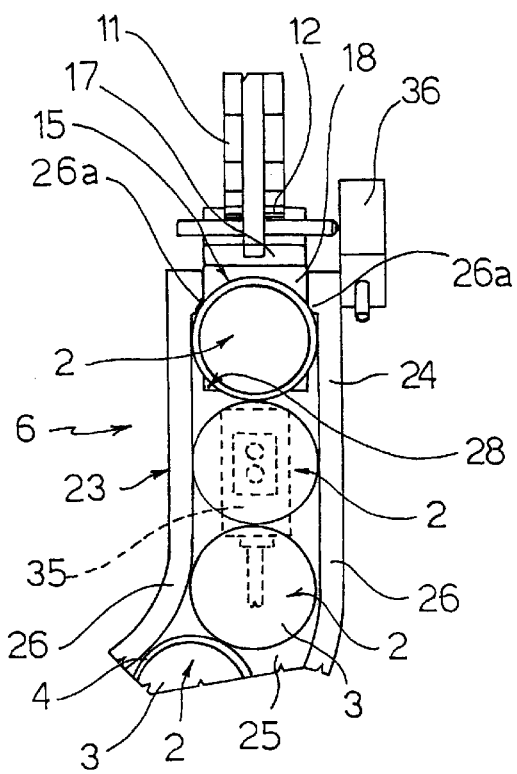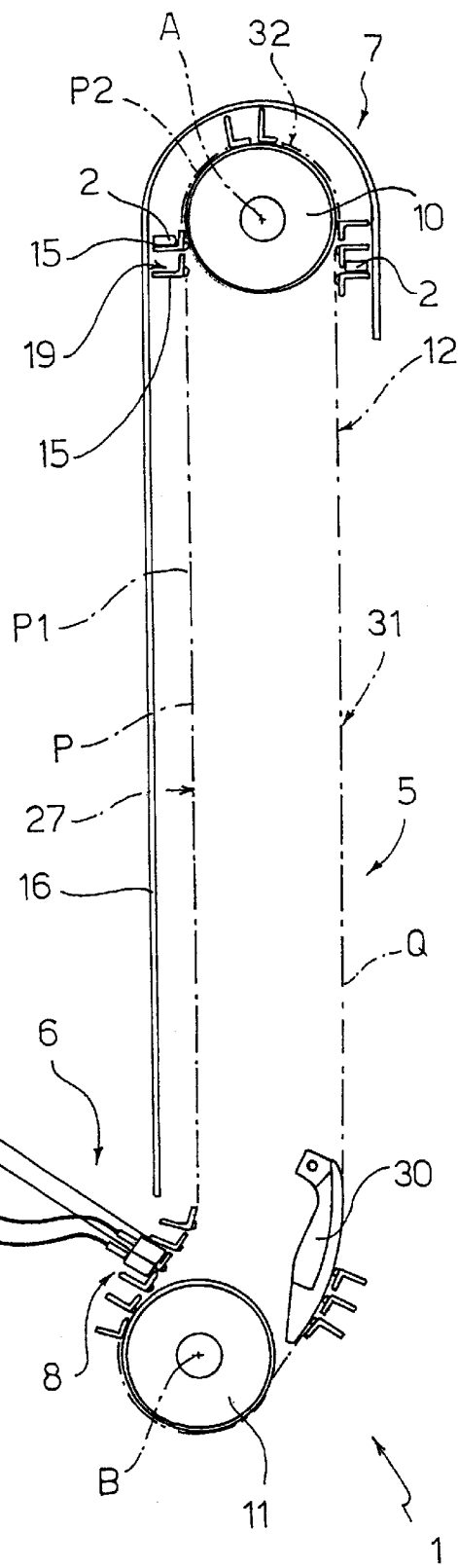
Fig. 2
Fig. 1

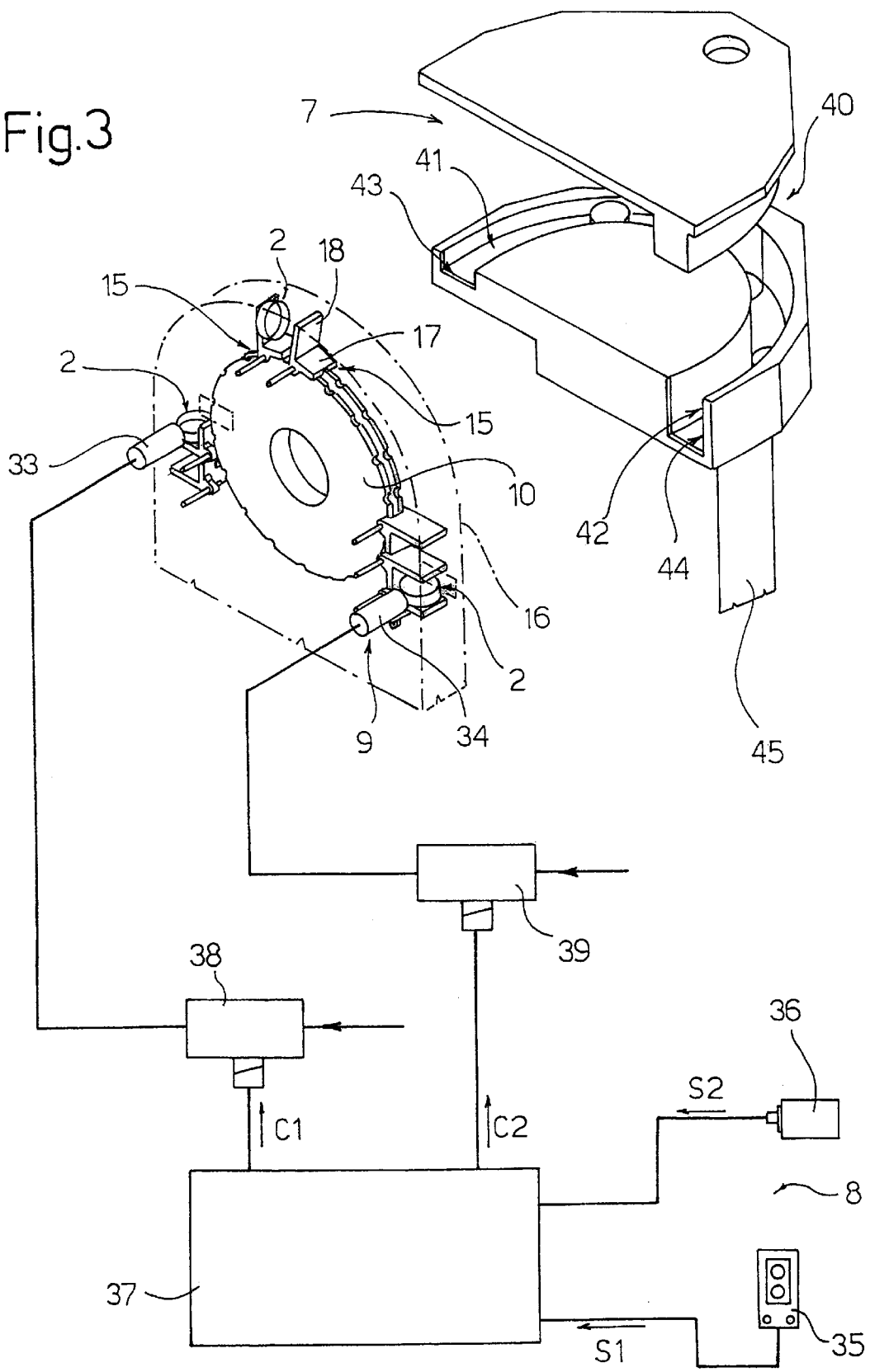

SELECTING DEVICE FOR ORIENTING IN A PREDETERMINED POSITION A SUCCESSION OF CAPS FOR SEALED POURABLE FOOD PRODUCT PACKAGES

BACKGROUND OF THE INVENTION

1. Field of the Invention

The present invention relates to a selecting device for orienting in a predetermined position a succession of caps for sealed pourable food product packages.

2. Description of the Related Art

Many pourable food products, such as fruit juice, UHT (ultra-high-temperature treated) milk, wine, tomato sauce, etc., are sold in packages made of sterilized packaging material.

A typical example of such a package is the parallelepipedal package for liquid or pourable food products known as Tetra Brik Aseptic (registered trademark), which is formed by folding and sealing laminated strip packaging material. The packaging material has a multilayer structure comprising a layer of fibrous material, e.g. paper, covered on both sides with layers of heat-seal plastic material, e.g. polyethylene. In the case of aseptic packages for long-storage products such as UHT milk, the packaging material comprises a layer of barrier material, e.g. an aluminium film, which is superimposed on a layer of heat-seal plastic material and in turn covered with another layer of heat-seal plastic material defining the inner face of the package eventually contacting the food product.

As is known, packages of the above type are produced on fully automatic packaging machines, on which a continuous tube is formed from the packaging material supplied in strip form. The strip of packaging material is sterilized on the packaging machine, e.g. by applying a chemical sterilizing agent, such as a hydrogen peroxide solution; following sterilization, the sterilizing agent is removed, e.g. vaporized by heating, from the surfaces of the packaging material; and the strip of packaging material so sterilized is kept in a closed sterile environment, and is folded and sealed longitudinally to form a vertical tube.

The tube is filled with the sterilized or sterile-processed food product, and is sealed at equally spaced cross sections at which it is then cut into pillow packs, which are subsequently folded mechanically into finished, e.g. substantially parallelepipedal packages. Various pasteurized pourable food products, such as milk and fruit juice, are packaged as described above—but with no need to sterilize the packaging material—in packages known as Tetra Brik (registered trademark) or in other types such as so-called Tetra Rex (registered trademark) packages.

Some packages formed as described above are known to comprise an opening through which to pour out the food product; and a cap applied to the packaging material to close the opening.

The caps are normally housed in bulk inside a store, from which they are fed successively to a selecting device in two opposite input positions, one upside-down with respect to the other.

The selecting device substantially comprises a conveyor—e.g. defined by an inclined guide member—for feeding the caps to an output station; a sensor assembly for determining whether the caps fed past it are set to a predetermined output position corresponding with one of the input positions; and an expulsion member, e.g. an air nozzle, which is activated selectively by the sensor assembly to feed the caps in said output position to a fitting device for fitting the caps to the packaging material. In particular, in the case of aseptic food product packaging, the caps are fitted directly to the finished packages; otherwise, the caps are fitted to the strip packaging material prior to folding the material into a vertical tube.

Conversely, if the cap fed past the sensor assembly is set to other than the output position, the expulsion member is not activated and the cap is fed back to the store from which it is again fed to the selecting device.

The number of caps fed past the sensor assembly in other than the output position, and hence fed back to the store, is normally fairly high, thus resulting in poor transportation efficiency and in only 70% of the capacity of the selecting device being exploited.

SUMMARY OF THE INVENTION

It is an object of the present invention to provide a selecting device for orienting in a predetermined position a succession of caps for sealed pourable food product packages, and which provides, in a straightforward, low-cost manner, for achieving a high degree of transportation efficiency.

According to the present invention, there is provided a selecting device comprising:

conveying means for receiving from a supply station a succession of caps—for sealed pourable food product packages—arranged randomly in two opposite input positions, in one of which said caps are upside-down with respect to other; and for transferring said caps to an output station;

sensor means for determining the position of each said cap with respect to said conveying means; and expulsion means which are located at said output station, are connected to said sensor means, and are activated selectively by said sensor means to expel from said conveying means relative said caps in a predetermined output position corresponding with a first of said input positions;

characterized in that said conveying means comprise a conveyor defining for said caps a path having a substantially U-shaped orienting portion along which the caps fed to said conveyor in a second of said input positions are rotated, by a predetermined angle about an axis crosswise to said orienting portion, substantially into said output position.

BRIEF DESCRIPTION OF THE DRAWING FIGURES

A preferred, non-limiting embodiment of the present invention will be described by way of example with reference to the accompanying drawings, in which:

FIG. 1 shows a schematic side view of a selecting device, in accordance with the present invention, for orienting in a predetermined position a succession of caps for sealed pourable food product packages;

FIG. 2 shows a larger-scale top plan view of a supply station for supplying the FIG. 1 selecting device;

FIG. 3 shows a larger-scale, exploded view in perspective of an output station of the FIG. 1 selecting device.

DETAILED DESCRIPTION OF THE PREFERRED EMBODIMENTS

Number 1 in FIG. 1 indicates as a whole a selecting device for orienting in a predetermined output position a succession of caps 2 for known sealed packages (not shown) of pourable food products such as pasteurized or UHT milk, fruit juice, wine, etc.

Device 1 may be incorporated or included in a production line comprising a packaging machine (not shown) for continuously producing packages of pourable food products, e.g. from packaging material in strip form (not shown) or from packaging material in the form of precut blanks.

Device 1 supplies a succession of caps 2, all in said output position, to a device (not shown) for fitting caps 2 to the packaging material. In particular, in the case of aseptic food product packaging, caps 2 are fitted directly to the finished packages; otherwise, the caps are fitted to the packaging material prior to folding the material to form the packages.

Caps 2 (FIGS. 2 and 3) are each defined by a flat, circular, disk-shaped body 3 having a raised peripheral edge 4 on one side.

With reference to FIG. 1, selecting device 1 substantially comprises a vertical chain conveyor 5 which is supplied by a supply station 6 with a succession of caps 2 arranged randomly in two opposite input positions—a first of which corresponds with the output position—and which feeds caps 2 along a path P to an output station 7. Selecting device 1 also comprises a sensor assembly 8 located at supply station 6 to determine the position of each cap 2 with respect to conveyor 5; and an expulsion assembly 9 which is positioned facing output station 7, is connected to sensor assembly 8, and is activated selectively by sensor assembly 8 to feed relative caps 2 in the output position from conveyor 5 to output station 7.

With reference to FIGS. 1 and 3, conveyor 5 comprises a drive wheel 10 and a driven wheel 11, which rotate about respective fixed parallel axes A, B; and an articulated chain 12 looped about wheels 10, 11 and having a number of supporting members 15 for respective caps 2. More specifically, wheels 10, 11 are arranged contacting the top and bottom end of chain 12 respectively.

Conveyor 5 defines, for supporting members 15, an endless path Q partly coinciding with path P of caps 2, as explained in detail later on.

Conveyor 5 also comprises a fixed cover member 16 which extends, facing and equidistant from chain 12, along path P of caps 2, and, viewed from the side, has the same profile as chain 12.

With reference to FIG. 3, each supporting member 15, viewed from the side, is L-shaped and comprises a flat first portion 17 tangent to path Q, and a flat second portion 18 projecting perpendicularly outwards from portion 17 towards cover member 16 (where present) and defining a support for respective cap 2.

Along path P, each cap 2 is therefore housed inside a respective cavity 19 open on opposite sides of chain 12 and defined by cover member 16, by portions 17, 18 of the respective supporting member 15, and by the portion 18 of the adjacent supporting member 15 facing the portion 18 supporting cap 2.

Each cap 2 fed to conveyor 5 in the first input position is positioned with disk-shaped body 3 contacting portion 18 of supporting member 15, while each cap 2 fed to conveyor 5 in a second of said input positions is upside-down with respect to caps 2 in the first input position, so that edge 4 rests on, and disk-shaped body 3 is detached from, portion 18.

With reference to FIGS. 1 and 2, supply station 6 is defined by an inclined guide member 23 extending crosswise to chain 12 and having an end portion 24 adjacent to chain 12 and just over wheel 11. More specifically, guide member 23 comprises an oblique supporting surface 25 bordered by two sides 26 and for successively feeding caps 2 downwards to chain 12; and supporting surface 25 defines an acute angle with a substantially straight, vertical forward branch 27 of chain 12.

At end portion 24 of guide member 23, supporting surface 25 has a C-shaped opening 28 which, in use, is engaged by portions 18 of supporting members 15 and, measured perpendicularly to sides 26, is smaller than the diameter of caps 2. To ensure perfect alignment of supporting surface 25 of guide member 23 and portion 18 of each supporting member 15, axes A, B of wheels 10, 11 are offset vertically and, also by virtue of known guide means (not shown) interacting with chain 12, define along the forward branch 27 of chain 12 an oblique initial portion adjacent to supply station 6 and substantially perpendicular to supporting surface 25 of guide member 23.

At respective ends adjacent to chain 12, sides 26 comprise respective transverse projections extending towards each other and defining, in use, a stop for arresting caps 2 in a predetermined expulsion position over opening 28 of supporting surface 25.

Conveyor 5 also comprises a tensioning member 30 cooperating with chain 12 close to wheel 11 and along a substantially straight, vertical return branch 31 of chain 12 facing forward branch 27.

According to an important aspect of the present invention, path P comprises a substantially straight, vertical upward portion P1 defined by forward branch 27 of chain 12; and a U-shaped orienting portion P2 defined by a winding portion 32 of chain 12 about wheel 10, and along which the caps 2 fed to conveyor 5 in the second input position are rotated 180° into the output position about an axis crosswise to orienting portion P2 and parallel to axes A, B.

According to another important aspect of the present invention, expulsion assembly 9 comprises two air nozzles 33, 34 located respectively up- and downstream from orienting portion P2 of path P, and which are activated independently by sensor assembly 8 to direct respective air jets onto the facing caps 2 in the output position and so blow caps 2, in a direction parallel to axes A, B, towards output station 7. In particular, nozzles 33, 34 are located on one side of winding portion 32 of chain 12 and, hence, of orienting portion P2 of path P.

With reference to FIG. 3, sensor assembly 8 comprises a first sensor 35, e.g. a photocell, fitted to supporting surface 25 of guide member 23, immediately upstream from opening 28, and generating a logic signal S1 indicating the position of cap 2 traveling past sensor 35; and a second sensor 36, e.g. a photocell, fitted in projecting manner to one of sides 26 of guide member 23, in a position adjacent to chain 12 and opening 28, and which generates a logic signal S2 indicating the presence of a respective cap 2 on the supporting member 15 traveling through opening 28.

More specifically, signal S1 assumes a high logic level (S1=1) when the cap 2 traveling past sensor 35 is in the first input position, and a low logic level (S1=0) in any other condition; and signal S2 assumes a high logic level (S2=1) when a respective cap 2 is present on the supporting member 15 traveling through opening 28, and a low logic level (S2=0) otherwise.

Signals S1 and S2 are sent to a central control unit 37, which generates respective control signals C1, C2 for respective solenoid valves 38, 39 for driving nozzles 33, 34.

More specifically, control signal C1 for driving solenoid valve 38, and hence activating nozzle 33, is generated by central control unit 37 after a predetermined first time interval T1 calculated from when signal S2 is received, and which is required by cap 2 in the first input position to travel along upward portion P1 of path P from sensor 36 to nozzle 33. Control signal C2 for driving solenoid valve 39, and hence activating nozzle 34, on the other hand, is generated by central control unit 37 after a predetermined second time interval T2, greater than T1, also calculated from when signal S2 is received, and which is required by cap 2 in the second input position to travel along the whole of path P from sensor 36 to nozzle 34.

Output station 7 comprises a receiving member 40 for receiving caps 2, and which is defined by a flat body adjacent to chain 12 and wheel 10, on the opposite side of chain 12 with respect to nozzles 33, 34. Through the flat body are formed two arc-shaped infeed conduits 41, 42, which have respective inlet openings 43, 44 facing and coaxial with nozzles 33, 34, and come out into a common vertical collecting conduit 45 connected to the cap 2 fitting device.

More specifically, conduits 41, 42 are each rectangular-sectioned, together define a substantial semicircle, and are located at different axial heights with respect to conduit 45 to prevent caps 2 blown simultaneously by nozzles 33, 34 into receiving member 40 from colliding.

Operation of selecting device 1 will be described with reference to one cap 2, and as of the instant in which said cap 2 is fed past sensor 35 along supporting surface 25 of guide member 23.

If cap 2 is set to the first input position, i.e. is already set to the output position with disk-shaped body 3 contacting supporting surface 25 of guide member 23, signal S1 sent by sensor 35 to central control unit 37 assumes a high logic level; cap 2 is fed to opening 28 and positioned resting on the lateral edges of the opening, from where it is picked up by portion 18 of a respective supporting member 15 traveling through opening 28; and the signal S2 sent to central control unit 37 by sensor 36 assumes a high logic level indicating the presence of cap 2 on the supporting member 15 engaging opening 28.

In response to signals S1 and S2, and after time interval T1 from when signal S2 is received, central control unit 37 supplies control signal C1 to solenoid valve 38 to activate nozzle 33. At the same time, cap 2 is fed by conveyor 5 along upward portion P1 of path P into a position facing nozzle 33. The air jet generated by nozzle 33 pushes cap 2 in a direction coaxial with inlet opening 43 of infeed conduit 41, so that cap 2 is blown into conduit 41 and is fed by force of gravity into collecting conduit 45 and along the collecting conduit to the fitting device.

Conversely, if cap 2 is set to the second input position, i.e. with edge 4 resting on supporting surface 25 of guide member 23 and with disk-shaped body 3 detached from supporting surface 25, signal S1 generated by the sensor assumes a low logic level, and signal S2 generated by the sensor again assumes a high logic level indicating the presence of cap 2 on the supporting member 15 engaging opening 28.

In response to signals S1 and S2, and after time interval T2 from when signal S2 is received, central control unit 37 supplies control signal C2 to solenoid valve 39 to activate nozzle 34. At the same time, cap 2 is fed by conveyor 5 along upward portion P1 and orienting portion P2 of path P into a position facing nozzle 34. More specifically, along orienting portion P2, cap 2 is rotated 180° about an axis parallel to axes A and B, is detached from portion 18 of respective supporting member 15, and comes to rest with disk-shaped body 3 on portion 18 of the adjacent preceding supporting member 15 along path P.

By the end of orienting portion P2 of path P, cap 2 is therefore set to the output position, i.e. to the first input position. The air jet generated by nozzle 34 pushes cap 2 in a direction coaxial with inlet opening 44 of infeed conduit 42, so that cap 2 is blown into conduit 42 and is fed by force of gravity into collecting conduit 45 and along the collecting conduit to the fitting device.

If no cap 2 is present on the supporting member 15 traveling through opening 28, signal S2 generated by sensor 36 assumes a low logic level, so that nozzles 33, 34 are not activated by central control unit 37.

The advantages of selecting device 1 according to the present invention will be clear from the foregoing description.

In particular, all the caps 2 fed from supply station 6 to chain 12 are fed directly, up- or downstream from orienting portion P2 of path P, to the fitting device, with no additional cycles by which to feed the caps back to the store and eventually back to chain 12.

As such, selecting device 1 provides for a high degree of transportation efficiency, as well as for maximum exploitation of its own capacity.

Clearly, changes may be made to selecting device 1 as described and illustrated herein without, however, departing from the scope of the accompanying Claims.

In particular, the caps 2 fed by nozzles 33, 34 into respective infeed conduits 41, 42 may be fed by conduits 41, 42 into respective independent vertical collecting conduits.

What is claimed is:

1. A selecting device comprising:
conveying means for receiving from a supply station a succession of caps for sealed pourable food product packages arranged randomly in two opposite input positions, in one of which said caps are upside-down with respect to other; and for transferring said caps to an output station;
sensor means for determining the position of each said cap with respect to said conveying means; and
expulsion means which are located at said output station, are connected to said sensor means, and are activated selectively by said sensor means to expel from said conveying means relative said caps in a predetermined output position corresponding with a first of said input positions;
wherein said conveying means comprise a conveyor defining for said caps a path having a substantially U-shaped orienting portion along which the caps fed to said conveyor in a second of said input positions are rotated, by a predetermined angle about an axis crosswise to said orienting portion, substantially into said output position.

2. A device as claimed in claim 1, wherein said predetermined angle by which caps are rotated along said orienting portion of said path is an angle of 180°.

3. A device as claimed in claim 1, wherein said expulsion means comprise first and second interaction means located respectively upstream and downstream with respect to said orienting portion of said path and activated independently by said sensor means to act on relative said caps facing the first and second interactive means and set to said output position.

4. A device as claimed in claim 3, wherein said output station comprises a first and a second infeed conduit which receive said caps from said first and second interaction means respectively, are located on the same side of said orienting portion of said path, and extend crosswise to the orienting portion.

5. A device as claimed in claim 4, wherein said first and second infeed conduit come out into said collecting conduit.

6. A device as claimed in claim 5, wherein said first and second infeed conduit come out into a single collecting conduit at different axial heights of the collecting conduit.

7. A device as claimed claim 4, wherein said first and second interaction means respectively comprise a first and a second thrust member located on the opposite side of said orienting portion of said path with respect to said first and second infeed conduit, and which exert, on relative said caps facing the first and second thrust member and set to said output position, respective thrusts directed coaxially with respective inlet openings of said first and second infeed conduit.

8. A device as claimed in claim 7, wherein said first and second thrust member respectively comprise a first and a second air nozzle.

9. A device as claimed in claim 1, wherein said conveyor comprises two wheels rotating about respective parallel axes; and a conveying member which is looped about said wheels, carries a number of supporting members equally spaced along said conveying member and for supporting respective said caps, and defines, for said supporting members, an endless path at least partly coincident with said path of said caps.

10. A device as claimed in claim 9, wherein said orienting portion of said path is defined by a winding portion of said conveying member about one of said wheels.

11. A device as claimed in claim 9, wherein said conveying member is defined by an articulated chain carrying said supporting members.

12. A device as claimed in claim 11, wherein each said supporting member, viewed from the side, is L-shaped and comprises a flat first portion extending in contact with said chain, and a flat second portion projecting perpendicularly from said first portion and outwards of said chain, and defining a support for a respective said cap.

13. A device as claimed in claim 12, wherein said conveyor comprises a fixed cover member extending, facing said chain, along said path and defining, with said supporting members, respective cavities open on opposite sides of said chain and housing respective said caps.

14. A device as claimed in claim 9, wherein said sensor means comprises a first and a second sensor located at said supply sation and respectively generating a first signal and indicating the position of each said cap, and a signal indicating the presence of a respective said cap on said supporting member traveling past said supply station.

15. A device as claimed in claim 14, comprising a central control unit connected to said first and second sensor and to respective solenoid valves for driving said first and second nozzle.

16. A device as claimed in claim 11, wherein said supply station comprises an inclined guide member extending crosswise to said chain and for successively feeding said caps downwards to a forward branch of said chain.

* * * * *